Jan. 6, 1942.  R. W. WIESEMAN  2,269,237

COOLING ARRANGEMENT FOR DYNAMOELECTRIC MACHINES

Filed Oct. 31, 1939  2 Sheets-Sheet 1

Inventor:
Robert W. Wieseman,
by Harry E. Dunham
His Attorney.

Jan. 6, 1942.  R. W. WIESEMAN  2,269,237
COOLING ARRANGEMENT FOR DYNAMOELECTRIC MACHINES
Filed Oct. 31, 1939  2 Sheets-Sheet 2

Inventor:
Robert W. Wieseman,
by Harry E. Dunham
His Attorney.

Patented Jan. 6, 1942

2,269,237

UNITED STATES PATENT OFFICE 2,269,237

COOLING ARRANGEMENT FOR DYNAMO-ELECTRIC MACHINES

Robert W. Wieseman, Schenectady, N. Y., assignor to General Electric Company, a corporation of New York Application October 31, 1939, Serial No. 302,144

10 Claims. (Cl. 171—252)

My invention relates to dynamo-electric machines and particularly to an arrangement for cooling such machines of the totally enclosed type.

It has been known to cool dynamo-electric machines of the totally enclosed type through the use of separate surface coolers and to provide a series of ducts to conduct the fluid in the enclosed machine to these separate surface coolers. It has also been known to cool high frequency alternators of the totally enclosed type by passing cooling water through passages which are in the core member.

An object of my invention is to provide a more effective cooling arrangement for such dynamo-electric machines, so that a much greater output can be obtained for a given size machine over that obtainable with cooling systems used in the past.

Another object of my invention is to provide a cooling arrangement for dynamo-electric machines of the totally enclosed type which dispenses with the use of any separate surface coolers and connecting ducts between the coolers and the machine.

I accomplish these objects by providing a dynamo-electric machine of the totally enclosed type with an improved cooling arrangement which makes use of both the circulation of gas which is in the totally enclosed machine and of cooling tubes which are placed in the stationary member. By using this improved cooling system in a dynamo-electric machine of the totally enclosed type I have found that it is possible to obtain an appreciable increase in output for a given size machine than was possible with machines cooled by methods heretofore used.

My invention will be more fully set forth in the following description referring to the accompanying drawings and the features of novelty which characterize my invention will be pointed out with particularity in the claims annexed to and forming a part of this specification.

Figure 1:
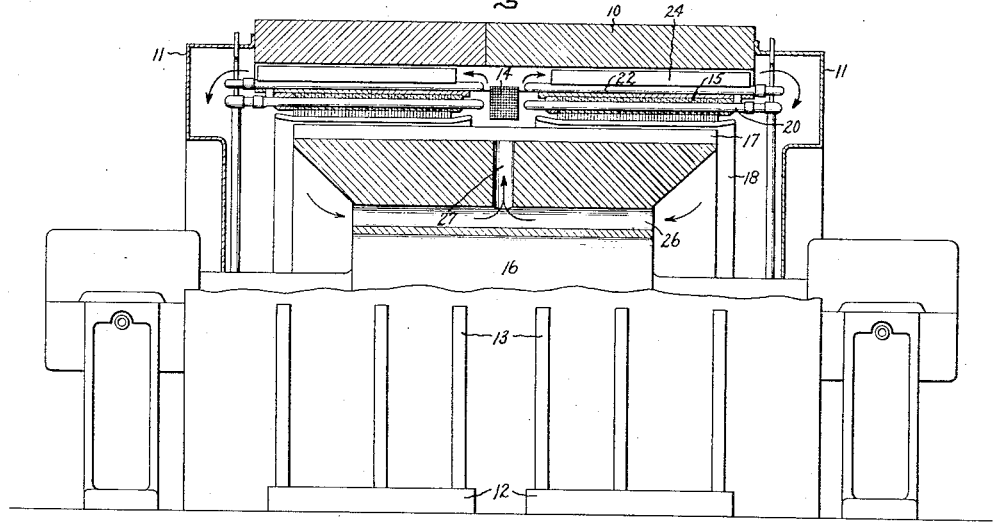
Figure 2:
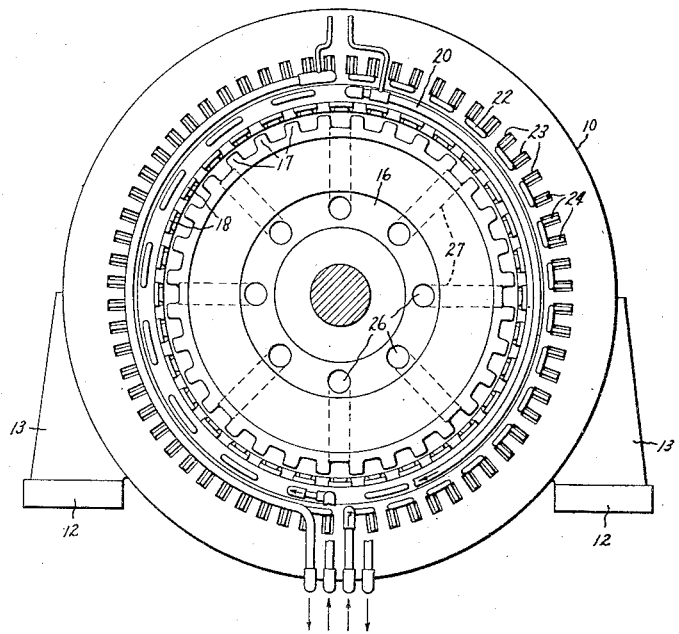
Figure 3:
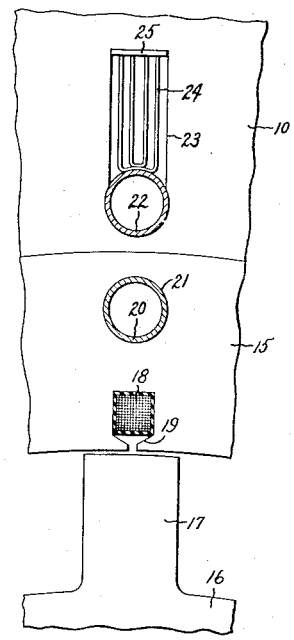
Figure 4:
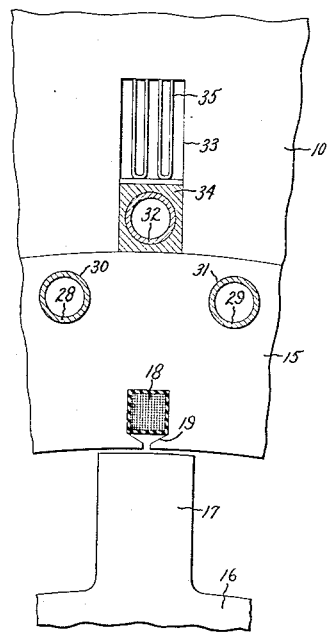
Figure 5:
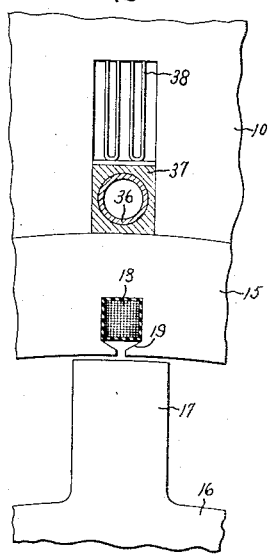
Figure 6:
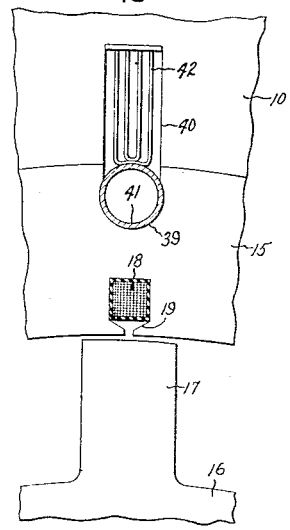

In the drawings Fig. 1 is a partial sectional side elevation of a totally enclosed dynamo-electric machine provided with an embodiment of my improved cooling system; Fig. 2 is an end view of the machine illustrated in Fig. 1; Fig. 3 is a sectional end elevation of the cooling arrangement in the stationary member shown in Figs. 1 and 2; Fig. 4 is a sectional end elevation of a modification of the cooling arrangement shown in Fig. 3; Fig. 5 is a sectional end elevation of a further modification of the cooling arrangement shown in Fig. 3 and Fig. 6 is a sectional end elevation of a further modification of the cooling arrangement shown in Fig. 3.

Referring to Figs. 1 to 3 of the drawings, I have illustrated a dynamo-electric machine of the high-frequency inductor type including a stationary member having a frame member 10 provided with end frames 11 which form with the frame member 10 a totally enclosed casing for the machine. The stationary member of the machine is supported by a base 12 which is attached to the frame member 10 by brackets 13. The excitation system of the machine includes a circular field exciting winding 14 supported by the frame member 10. The assembly of this circular coil on the frame is facilitated by forming a core member 15 in two halves with a space between the halves of the core to accommodate the circular coil. The magnetic circuit of the machine is completed through a rotatable member 16 which has circumferentially spaced apart teeth 17 extending axially about the periphery thereof. The magnetic excitation system thus provided is adapted to induce an electric voltage in an armature winding 18 which is supported in winding slots 19 in each half of the core member 15. The rotatable member may be rotated by any suitable source of mechanical power such as by a motor (not shown), which may be designed to operate on the particular voltage in the locality where this high frequency inductor generator is to be used.

In dynamo-electric machines one of the main factors which limits the output thereof is the temperature rise of the machine during normal operation. I have found that it is possible to increase greatly the kva. output obtained from such machines by providing both the core and frame of the stationary member with longitudinally extending passages 21, 23, and further providing an arrangement for circulating a cooling liquid, such as water, therethrough. In order to further increase the rate at which heat may be conducted from the machine, I provide fin members 24 on a tube 22 in the frame passage 23. The heat, therefore, developed by the losses in the machine will be conducted away through the circulation of gas, such as air, in the enclosing casing over the fin members or by conduction through the stationary member to the cooling passages. As more clearly shown in Fig. 3, these cooling passages include copper tubes 20 in the axially disposed passages 21 in the laminated core member 15 and the copper tubes 22 in the axially disposed passages 23 of the frame member 10. These copper tubes may be securely held in the passages 21 and 23 of the core and frame members in any suitable manner, such as by expanding the tube into close surface contact with the bores of these passages. The passages 21 in the core member 15 are made only large enough to accommodate the cooling tube 20, but the passages 23 in the frame member 10 are made sufficiently large to accommodate the cooling tubes and cooling fins 24 which are attached thereto. These cooling fins may be attached to the copper tube in any suitable manner, such as by silver soldering. The fin members 24 have a connecting member 25 across the ends remote from the tube 22 so as to firmly support the fin members and to align them in the passages 23. The fins and tube member may be formed first as an integral structure and then inserted into the passage 23 in the frame member. As is shown in Fig. 2, the cooling tubes 20 and 22 have connections with some source of cooling liquid outside the machine.

In order to provide a structure to cause the air in the enclosed machine to circulate through the passages in the stationary member I provide in the rotatable member, as shown in Figs. 1 and 2, axially and radially disposed connecting passageways 26 and 27 respectively. The rotation of the member 16, therefore, provides a centrifugal fan action which circulates the air in through the outside ends of the axial passageways 26, out the radial passageways 27, over the ends of the armature windings 18 and around the field exciting winding 14 and through the passages 23 where the heated air comes in contact with the relatively cool fin members 24. The air then passes out the ends of the passages 23 and circulates down through the annular space between the ends of core member and the end members 11 until it again comes to the passageways 26 in the rotatable member. This general movement of the air is shown by the arrows in Fig. 1. The heat thus received by the circulating air as it passes through the rotatable member and around the field exciting coil is transferred through the fin members to the cooling tubes 22. Some of the heat which is developed adjacent to the tubes 20 in the core member will pass by conduction through the core member to these cooling tubes. I have found that such a cooling system allows a dynamo-electric machine such as of the type which I have described to deliver a considerable increase in power over that which the same size machine could when cooled with the systems heretofore known.

I have found that the losses of totally enclosed inductor generators may resolve themselves into the five following components: windage and friction losses, core losses, load losses, resistance losses in the armature, and resistance losses in the field. With the use of only a cooling tube in the core member as used in the past, I have found that the windage and friction losses were not dissipated, that the core losses were dissipated, that the load losses were only partially dissipated, that the resistance losses in the armature were dissipated and that the resistance losses in the field excitation winding were not dissipated. However, with my improved cooling system all these five losses can be effectively dissipated. It may, therefore, be seen that with this improved cooling system an unexpected increase in output can be derived from a given size machine than could be obtained from a similar machine cooled by methods heretofore known.

In the modification shown in Fig. 4, two tubes 28 and 29 are placed in longitudinally extending passages 30 and 31 in the core member 15 adjacent to each tube 32 which is placed in the passage 33 in the frame member 10. As described with reference to Fig. 3, the tubes 28 and 29 may be inserted in passages 30 and 31 in the core member 15 by any suitable means, such as by expansion joint, while the cooling tubes 32 in the frame 10 are held in a soft material 34, such as babbitt. The fin members 35 are in turn attached to the tube member 32 through the Babbitt material.

In the modification shown in Fig. 5 there is placed a tube member 36 encased in any suitable soft material 37, such as babbitt, in the frame member 10, with fin members 38 similar to that placed in the frame member shown in Fig. 4. No cooling tubes are placed in the core member. I have found that this modification is desirable for use in small and medium size machines where the outer tube can be placed relatively close to the armature winding, but this arrangement will not dissipate as great an amount of heat as can be dissipated with the arrangement described in Figs. 3 and 4.

In the modification shown in Fig. 6, there are placed longitudinally extending interconnecting passages 39 and 40 in the core and frame members, respectively. Into the passages 39 of the core member I provide a cooling tube 41. This cooling tube has attached to it by any suitable means, such as by silver soldering, heat exchanging fin members 42. The passage 39 in the core member 15 is so dimensioned that the tube member 41 is held therein, the fin members 42 being allowed to project into the passage 40 in the frame member 10.

The circulation of air in the enclosing casing over the surfaces of the fin members in the modifications shown in Figs. 4, 5, and 6 is the same as that described with reference to Figs. 1, 2, and 3.

In view of the foregoing it will be seen that I have provided a cooling system for dynamo-electric machines of the totally enclosed type which provides much more effective arrangement for dissipating the different losses incident to the normal operation thereof and which dispenses with all use of separate surface coolers and external connecting ducts.

Modifications of the particular arrangements which I have disclosed embodying my invention will occur to those skilled in the art, so that I do not desire my invention to be limited to the particular constructions set forth and I intend in the appended claims to cover all modifications which do not depart from the spirit and scope of my invention.

What I claim as new and desire to secure by Letters Patent of the United States, is:

1. A dynamo-electric machine comprising a frame member, a split core member mounted therein and end frames forming with said frame member a totally enclosed casing for said machine, a rotatable member, slots in said core member forming teeth, a winding in said slots, said core member and said frame member having longitudinal passages extending from the split to said end frames, means for circulating gas radially through the split in said core member and then axially through said passages in said frame member, and means for supplying cooling liquid to said passages in said core member and frame member.

2. A dynamo-electric machine comprising a frame member, a core member mounted therein and end frames forming with said frame member a totally enclosed casing for said machine, a rotatable member, slots in said core member forming teeth, a winding in said slots, said core member and said frame member having longitudinally extending passages therethrough, and means for supplying cooling liquid to said passages in said core member and frame member, said passages in said frame member communicating with the space within said casing, said rotatable member being constructed and arranged to provide a fan action which circulates gas in heat conductive relationship through said cooling passages in said frame member.

3. A dynamo-electric machine comprising a frame member, a core member mounted therein and end frames forming with said frame member a totally enclosed casing for said machine, a rotatable member, slots in said core member forming teeth, a winding in said slots, said core member and said frame member having passages therethrough, tubes in said passages, fin members secured on said tube within one of said passages, and means for supplying cooling liquid to said tubes in said core member and frame member, said tube and fins in said one of said passages only partially filling said passage, said last mentioned passage communicating with the space within said casing, said rotatable member being constructed and arranged to provide a fan action which circulates gas through said passages having said fin members.

4. A dynamo-electric machine comprising a frame member, a core member mounted therein and end frames forming with said frame member a totally enclosed casing for said machine, a rotatable member, slots in said core member forming teeth, a winding in said slots, said core member and said frame member having passages therethrough, tubes in said passages, fin members secured on said tube within said frame passage, and means for supplying cooling liquid to said tubes in said core member and frame member, said tube and fins in said frame passage only partially filling said passage, said last mentioned passage communicating with the space within said casing, and said rotatable member being constructed and arranged to provide a fan action which circulates gas through said passages having said fin members.

5. A dynamo-electric machine comprising a frame member, a core member mounted therein, a field exciting winding, end frames forming with said frame member a totally enclosed casing for said machine, a rotatable member, slots in said core member forming teeth, a winding in said slots, said core member and said frame member having passages therethrough, tubes in said passages, fin members in said frame passages and attached to said tube in said frame passage, means for supplying cooling liquid to said tubes in said core member and frame member, and axially and radially disposed connected passages in said rotatable member, said tube and fins in said frame passage only partially filling said passage, said last mentioned passage communicating with the space within said casing, said rotatable member passages being arranged to provide a fan action which circulates gas through said passages in said rotatable member and through said passages having said fin members.

6. A dynamo-electric machine comprising a frame member, a split core member mounted therein, a field exciting winding disposed between the halves of said split core member, end frames forming with said frame member a totally enclosed casing for said machine, a rotatable member, slots in said core member forming teeth, a winding in said slots, said core member and said frame member having passages therethrough, tubes in said passages, fin members in said frame passages on said tube in said frame passage, means for supplying cooling liquid to said tubes in said core member and frame member, and axially and radially disposed connected passages in said rotatable member, said radial passages being in that portion of the rotatable member adjacent the split in said core member, said tube and fins in said frame passage only partially filling said passage, said last mentioned passage communicating with said space within said casing, said rotatable member passages being arranged to provide a fan action which circulates gas through said passages of said rotatable member around said field exciting winding and over said fins whereby the heat developed in said rotatable member and field exciting windings is dissipated through said fins to said cooling tube in said frame member.

7. A dynamo-electric machine comprising a stationary member having a frame member, a split core member, a field exciting winding disposed between the halves of said core member, end frames forming with said frame member a totally enclosed casing for said machine, a rotatable member, slots in said core member forming teeth, a winding in said slots, passages through said stationary member frame and core, tubes in said passages, fin members in said frame passages on said tubes, means for supplying cooling liquid to said tubes in said stationary member, and radially and axially disposed connected passages in said rotatable member, said radial passages being in that portion of the rotatable member adjacent the split in said core member, said tubes and fins only partially filling said passages in said stationary member, said last mentioned passages communicating with the space within said casing, and said rotatable member passages being arranged to provide a fan action which circulates gas through said passages in said rotatable member around said field exciting winding and over said fin members.

8. A dynamo-electric machine comprising a stationary member having a frame member, a split core member, a field exciting winding disposed between the halves of said split core member, end frames forming with said frame member a totally enclosed casing for said machine, a rotatable member, slots in said core member forming teeth, a winding in said slots, longitudinally extending passages through said frame member, tubes in said passages, fin members in said frame passages on said tubes, means for supplying cooling liquid to said tubes in said frame member, and radially and axially disposed connected passages in said rotatable member, said radial passages being in that portion of the rotatable member adjacent the split in said core member, said tubes and fins only partially filling said passages in said frame member, said last mentioned passages communicating with the space within said casing, said rotatable member passages being arranged to provide a fan action which circulates gas through said passages in said rotatable member around said field exciting winding and over said fin members.

9. A dynamo-electric machine comprising a frame member, a core member mounted therein and end frames forming with said frame member a totally enclosed casing for said machine, a rotatable member, a winding in said core member, passages in said core and frame members, tubes in said passages in said core member, fin members on said tubes, said fin members extending into said passages in said frame member and only partially filling said passages, said last mentioned passages communicating with the space within said casing, and means for supplying cooling liquid to said tubes in said core member.

10. A dynamo-electric machine comprising a frame member, a split core member, a field exciting winding disposed between the halves of said split core member and end frames forming with said frame member a totally enclosed casing for said machine, a rotatable member, slots in said core member forming teeth, a winding in said slots, passages in said frame and core members, tubes in said passages in said core member, fin members on said tubes, said fin members extending into said passages in said frame member and only partially filling the said passages, said last mentioned passages communicating with the space within said casing, means for supplying cooling liquid to said tubes in said core member, and radially and axially disposed connected passages in said rotatable member, said radial passages being in that portion of the rotatable member adjacent the split in said core member, said rotatable member passages being arranged to provide a fan action which circulates gas through said passages in said rotatable member around said field exciting winding and over said fin members.

ROBERT W. WIESEMAN.